Figure 1:
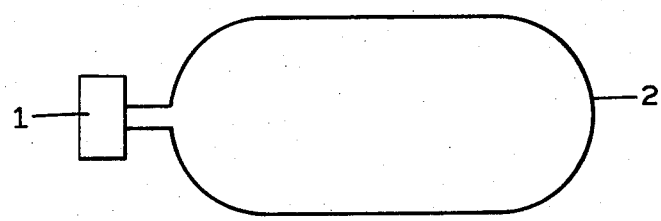

United States Patent [19]
Sack et al.

[11] 3,730,551
[45] May 1, 1973

[54] IRREVERSIBLE ENERGY ABSORBING AIR BAG SYSTEM

[75] Inventors: John J. Sack, Bloomfield Hills, Mich.; Steven Acs, Sarnia, Ontario, Canada

[73] Assignee: Allied Chemical Corporation, New York, N.Y.

[22] Filed: Jan. 11, 1971

[21] Appl. No.: 105,294

[52] U.S. Cl................................280/150 AB, 139/420
[51] Int. Cl..................................................B60r 21/10
[58] Field of Search...............280/150 AB; 244/145, 244/31; 139/420, 421, 422

[56] References Cited

UNITED STATES PATENTS

| | | | |
|---|---|---|---|
| 3,473,824 | 10/1969 | Carey et al. | 280/150 AB |
| 3,618,979 | 9/1971 | Gulette | 280/150 AB |
| 3,638,755 | 2/1972 | Sack | 280/150 AB |
| 3,451,693 | 6/1969 | Carey | 280/150 AB |
| 3,481,424 | 12/1969 | Barr | 180/124 |
| 3,222,016 | 12/1965 | Boone | 244/145 |
| 1,961,961 | 6/1934 | Coldwell | 139/421 |
| 2,526,264 | 10/1950 | Neff | 244/145 X |
| 3,593,757 | 7/1971 | Haynes | 139/420 |
| 2,897,603 | 8/1959 | Behrman | 139/387 |

FOREIGN PATENTS OR APPLICATIONS

| | | | |
|---|---|---|---|
| 1,460,601 | 4/1969 | Germany | 139/421 |

*Primary Examiner*—Kenneth H. Betts
*Attorney*—Jonathan Plaut

[57] ABSTRACT

This invention relates to energy absorption in a passenger restraint system as a result of the use of an expansible passenger restraint bag. More specifically, this invention relates to the introduction of an expansible energy absorbing bag which will not return to its original size upon expansion and which is utilized to restrain forward motion of a passenger within a motor vehicle.

2 Claims, 2 Drawing Figures

PATENTED MAY 1 1973  3,730,551

INVENTORS:
JOHN J. SACK
STEVEN ACS
BY

Jonathan Blant
ATTORNEY

IRREVERSIBLE ENERGY ABSORBING AIR BAG SYSTEM

This invention relates to energy absorption in a passenger restraint system as a result of the use of an irreversible barrier which forms the passenger restraint bag. More specifically this invention relates to the introduction of (1) an energy absorbing expansible barrier bag or (2) expansible barrier material within an air bag, which is utilized to restrain forward motion of a passenger within a motor vehicle. Particularly, the energy absorbing barrier acts to dissipate the total amount of energy of the fluid material which inflates the passenger restraint air bag, and especially to reduce the sound level of inflation, by expanding on contact with the inflating medium but not being able to return to its unexpanded shape of volume, thus being irreversibly expanded.

One of the principle problems in the inflation of passenger restraining air bags by a generated gas or gas from a component gas source, or a combination of the two, is the audible sound caused by a rapid movement of the gas into the passenger restraint bag. The level of sound produced is not uniform in the prior art, as will be described hereinafter in detail, and such sound produced will peak at high and potentially unacceptable levels, such as in the range of 168–170 decibels.

It is, therefore, an object of this invention to provide for the absorption of the energy of the gas expanding an air bag restraint system, such that the total amount of energy produced for inflation of the air bag is dissipated over a period of time and the peak levels of sound pressure are reduced so that decibel level is lowered into an acceptable range.

These and other objects and advantages will become more apparent in the context of the following more detailed description of the invention.

Generally, energy absorbing means are provided by a passenger restraint bag, typically to be found within an automobile. The energy absorbing means is in the form of a stretchable air expandable bag. The bag may be porous so that gas entering into it will be emitted from it. The absorption of the energy of the inflating medium by the barrier as a result of its expansible, that is expandable or elastic movement under the pressure of the energy entering thereinto dissipates the total amount of said energy over a period of time and reduces the peak decibel level of said energy. When the energy of the inflating material is directed against the wall of the energy absorber, it stretches or expands breaking up the energy wave. This results in a lowering of the peak decibel range of the system.

The energy absorbing expansible member is irreversible, that is, once it is expanded or stretched it substantially cannot return to its original shape or volume, as will be described in more detail hereinafter.

The U. S. Pat. to Carey et al., No. 3,473,824 discloses a system with inner barrier and outer bag arrangement for absorption of kinetic energy of the inflating medium. However, among other differences in Carey et al, the inner barrier merely unfolds and then bursts or otherwise emits the inflating medium into an outer bag. Where Carey et al. provides for a baffle, the energy absorbing characteristic of stretching is also unprovided for, since gas in one embodiment is circulated around the outside thereof, and the baffle is generally used only as a deflection barrier.

Figure 2:
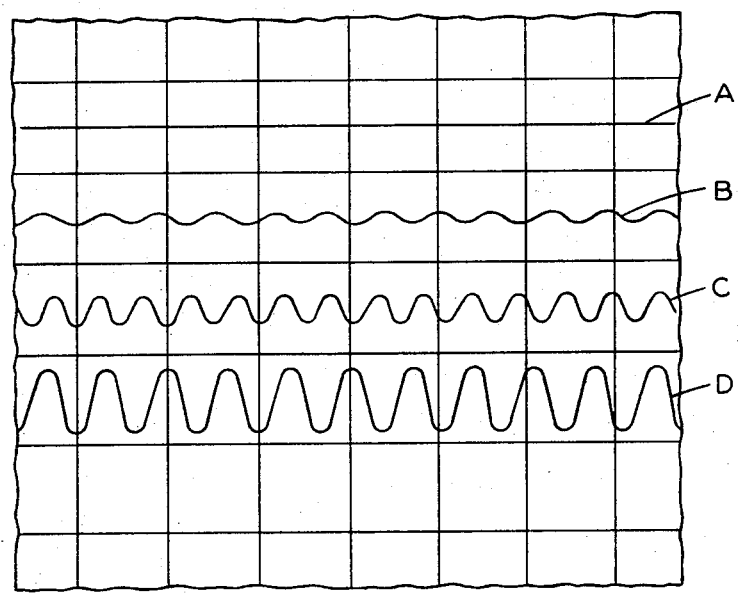

Describing in further detail in relation to the drawings:

FIG. 1 generally shows the embodiment of the invention with an energy absorbing bag; and FIG. 2 is a detail of the invention showing one embodiment for carrying out energy absorbtion.

According to the invention, an inflating medium is obtained from a source 1, as is well known in the art. For example, the inflating medium, which is gas obtained from either a gas generator system or a compressed gas source, or a combination of the two. The inflating medium is directed at least partially toward an energy absorber in the form of an expandable or elastic barrier. In the embodiment of FIG. 1, the inflating means is directed into an expansible bag 2, said bag having either expandable or elastic walls which extend under pressure. In the embodiment shown in FIG. 1, all of the inflating material is directed into the bag 2, the bag acting for passenger restraint in the known manner.

In the embodiment of FIG. 2, the detail of the bag shown is preferably knit and made, for example, of nylon or polyester material. Other materials may also be utilized. The knitting and weaving operations, of course, are known and not the object of this invention. The knit bag of one embodiment will expand on filling with the relatively straight (and thus short) fibers (a) breaking under the pressure of expansion, followed preferably by sequential breaking of one or more other longer fibers (B and C) until the fiber D is reached which is not broken, that is: is above the minimum strength requirement. The fibers which break are gathering fibers in both the warp and weft direction (in the case of weaving) of the weave of the bag. The extension and fracture of one or more of these fibers serves to absorb the shock of the moving inflating medium. The expansion in one embodiment may be in the range of at least 50-100% of its original volume and thus absorb the energy of the inflating material entering thereinto, dissipating the total amount of said energy over a period of time and reducing the peak sound level of said energy.

In an alternative embodiment, the fibers of the weave or knitting of the bag are stretchable over their original length, so that the bag will function to dissipate the energy of the inflating medium, but are unreturnable to their original unstretched position. This bag may be accomplished by using, for example, Nylon fiber that has not been drawn. By determining successive fibers A, B and C, for example, in FIG. 2, to be of different length or stretchable at a different rate, the step by step absorbtion of energy on inflation may preferably be effected. As in the use of the earlier described embodiment, fiber D, that is a final fiber in length would not be stretchable and thus would determine the fully expanded volume of the bag, preferably.

In the case of the bag disclosed, as the bag expands the spaces between the warp and weft or between the knitted material preferably open and movement of inflating material therethrough from the bag will be facilitated.

Although the invention has been described with relation to two embodiments, it is understood that the intention is that it only be limited by the scope of the following claims and not by the apparatus, materials, or methods of employing them as recited above.

We claim:

1. Air bag restraint system comprising an energy absorbing extensible, in volume, bag, means for introducing inflating gas into said bag to fill and extend the volume of said bag, said bag including at least two fibers of different lengths which irreversibly extend and rupture to allow for successive extension of the bag, said bag being woven and having spaces between the weave for passing the inflating gas therethrough on inflation said two fibers extending in the same general direction in either the weft or warp of the bag.

2. Air bag restraint system of claim 1 said fibers formed of undrawn nylon.

* * * * *